United States Patent

[11] 3,539,222

| [72] | Inventors | Frank Hollenton;<br>John L. Ingalls, Richmond, Virginia |
|---|---|---|
| [21] | Appl. No. | 730,315 |
| [22] | Filed | May 20, 1968 |
| [45] | Patented | Nov. 10, 1970 |
| [73] | Assignee | American Machine & Foundry Company<br>a corporation of New Jersey |
| [32] | Priority | May 30, 1967 |
| [33] | | Great Britain |
| [31] | | 24,919/67 |

[54] PNEUMATIC CONVEYOR
6 Claims, 4 Drawing Figs.

[52] U.S. Cl. .................................................... 302/2, 302/62

[51] Int. Cl. .................................................... B65g 53/50
[50] Field of Search .......................................... 302/2, 62, 11, 12, 13

[56] References Cited
UNITED STATES PATENTS

| 2,842,923 | 7/1958 | Kjellsen........................ | 302/2 |
| 3,042,454 | 7/1962 | Eissmann et al. .............. | 302/2 |
| 3,370,891 | 2/1968 | Dellaquila et al. ............. | 302/62 |

*Primary Examiner*—Andres H. Nielsen
*Attorneys*—George W. Price and Eli Weiss

ABSTRACT: An air lock device for the terminus of a pneumatic cigar conveyor having means for controlling the air and additional means for controlling the removal of the article therefrom.

Patented Nov. 10, 1970
3,539,222
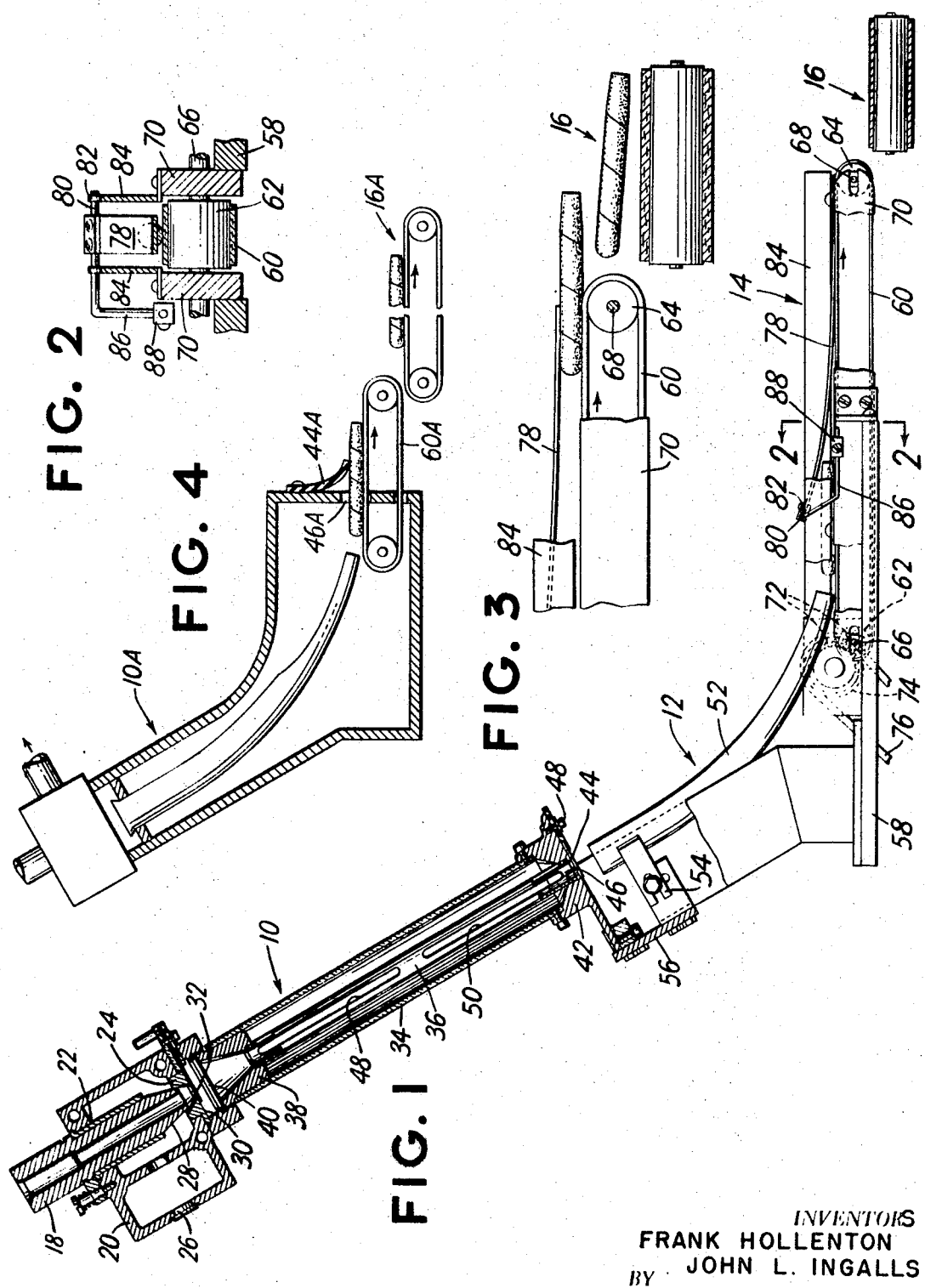
INVENTORS
FRANK HOLLENTON
JOHN L. INGALLS
BY
ATTORNEY

PNEUMATIC CONVEYOR

The present invention relates to pneumatic conveyors for fragile articles, such as cigars and the like, and, in particular, to a terminal device for pneumatic transport for such articles.

In U.S. Pat. No. 3,370,891, issued Feb. 27, 1968, to Dellaquila et al., there is disclosed a terminal air lock device employed in a tubular pneumatic cigar conveyor. The present invention is an improvement of such device and has as its main object the provision of a means by which the cigars may be removed from the system in a uniform manner.

It is another object of this invention to provide a discharge device for a pneumatic transport system in which the articles discharged are assisted in their removal and are simultaneously spaced from the preceeding and succeeding articles.

It is another object of this invention to improve the air lock device described in the aforementioned Dellaquila et al. patent so as to provide a speed reduction to the article prior to its discharge from the pneumatic system, thereby eliminating any adverse effect on the article as it passes from one atmospheric condition to another.

These objects and advantages, as well as others, will be apparent from the following description and the accompanying drawings wherein;

FIG. 1 is an elevational view of the discharge device of the invention;

FIG. 2 is a sectional view along line 2–2 of FIG. 1;

FIG. 3 is an enlarged view partially broken away showing the end section of the device, and;

FIG. 4 is a schematic view of a modified version of device.

Referring to FIG. 1, the present device comprises briefly an air lock mechanism 10, an intermediate guide transport 12, an endless belt discharge conveyor 14 and a receiving section 16 adapted to collect the discharged article.

The air lock mechanism 10 is connected to the final section of a conventional tubular conveyor 18 and comprises a hollow manifold housing 20 having opposed inlet and outlet openings 22 and 24, respectively, and an air exit port 26 adapted for connection to a source of high vacuum. The housing 20 is secured at its upper end to tube 18, in a conventional manner, so that the tube which is provided with a tapered end 28 extends through the inlet 22 substantially into the outlet opening 24. The end wall 30 of the manifold surrounding the outlet opening is tapered to conform to the shape of the tube end 28 and of a radially wider diameter so that a substantial space is maintained between the two. The source of vacuum will force an air flow pattern from within the tubular conveyor 18, through the outlet opening 24, the manifold 20 and out the exit port 26 as indicated by the arrows.

The manifold housing 20 may be cylindrical or rectangular, however, the wall 30 surrounding outlet opening 24 is provided with a flat outer face across which is mounted a flexible flap 32 hinged conventionally within a bracket 35. The flap 32 covers the outlet opening 24 and normally seals the opening against the atmosphere on application of suction to the manifold housing 20. Extending from the outlet opening 24 is an elongated tubular housing 34 within which is coaxially mounted a second tube 36. The inner tube 36 is sealed at its upper end within a conical annular coupling 38 which also is employed to secure the outer tube 34 to the manifold housing 20. An O-ring 40 seals the coupling 38 against inflow of air from the atmosphere. The lower or downstream end 46 of the inner tube 36 is similarly sealed within an annular coupling 42 which also is employed as part of the supporting bracket for the lower end of the outer tube 34. Across the outlet end 46 of the tube 36 there is secured a second flexible flap 44 hinged at 48 to the coupling 42. Finally, the inner tube 36 is provided with a series of elongated slots 50 which permit flow of air between the tube 36 and the outer tube 34.

It will, of course, be observed that the construction hereinbefore described is markedly similar to the structure shown in the aforementioned Dellaquila et al. patent. Indeed, as far as the general concept of a double flap terminal discharge device is concerned, such structure and its operation are similar. It will be equally observed that there are marked distinctions and changes in structure from that shown in the aforementioned patent. These changes in structure are substantial and provide substantial operating benefits not achieved with the prior structure.

First, it will be noticed that the tubular conveyor 18 extends so that its tapered end terminates within the outlet opening 24 of the manifold 20. The air flow induced by such construction, as shown by the arrows, is applied to the conveyor tube at its very end and not through ports or holes at some point near but remote thereto. Thus, the article conveyed through the tube 18 is under the control suction completely until its actual discharge. Further, the fact that the flap 32 is operated on by being in communication with the source of suction through the manifold itself, rather than through the tube 18, insures more positive suction control permitting the flap to seal securely against the face 30. Further, the manifold itself remains sealed until the last instant prior to the forced opening of the flap by the conveyed article. Additionally, when the article reaches the flap, the space between opening 24 and the tube terminus 28 is substantially reduced, reducing as a consequence the amount of suction on the flap thus permitting the flap to be opened by the article with a minimum of force. The pneumatic system may thus be operated at a relatively low suction level since little or no escape of suction is effected upon discharge of the article.

Secondly, the tube within a tube construction effected by tubes 34 and 36 has the advantage of reducing the speed of the article per se. This construction eliminates any interference which might arise by having an article, i.e., cigar, travelling through an evacuated tube of approximately the same diameter as in the aforementioned patent. The suction chamber of tube 34 is substantially larger than the diameter of the cigar and there is thus substantial volumetric capacity for movement of both cigar and air. Consequently, lower air velocities are employed resulting in lower article speed.

Additionally, this construction permits greater control of the downstream flap 44. Since positive suction is always effected on the flap through the annular chamber created by the outer tube 34 and its communication with the interior of the tube 36 through the slots 48, it is only when a cigar or articles actually reaches the downstream flap 44 that the effect of suction is removed from this flap. Consequently, the flap 44 will not oscillate or become dislodged from the outlet opening 46 merely on entry and movement of the article through tube 36.

The article, i.e., cigar, will thus be delivered to the curved intermediate guide mechanism at a greatly reduced speed from that which it had in the transport system. The intermediate mechanism 12 comprises merely a curved open chute 52 mounted in conventional manner by bracket 54 to support 56 which also supports the downstream coupling 42 of the terminal discharge section. Support 56 is fixed to or is a part of a support base 58.

The cigars are deposited from the chute 52 onto a longitudinally moving endless conveyor belt 60. The conveyor belt 60 is fitted about a pair of spaced rollers 62 and 64 which are conventionally mounted about freely rotatable shafts 66 and 68. The shafts are respectively secured in suitable bearings in a pair of parallel mounted vertical side walls 70 secured to the base 58. The roller shaft 66 is provided with a suitably arranged gear mechanism 72 and a pulley 74 connected to drive belt 76 driven by conventional variable motor drive means not shown. By this, the conveyor belt may be continuously driven at a selected operating speed. The operating speed of the belt is preferably selected as a function of the inertial forces of the exiting cigars and it is adjusted to a value at which the cigars fall and stack on the belt in an orderly pattern regardless of the rate of infeed; that is to say, the rate can vary at random from 1 to 300 cigars/minute. For a reason to be explained later, the belt 60 is mounted slightly above the receiving section 16 so that the articles exiting therefrom will have a slight tendency to fall.

Located above the upper run of belt 60 is a lightweight flexible bladelike member 78 preferably made of narrow gauge steel. Fixed at the rear end of the blade 78 is an axle 80, freely rotatable within a bearing bracket 82 mounted on the upper edge of conveyor side guides 84. The blade 78 is of such a width as to be smaller than the distance between the side guides 70 but of sufficient width to substantially cover the article resting on belt 60. Accordingly, the blade will pivot about axle 80 and hold the article against the belt surface (with minimal drag force on the article) as it travels on the belt. Axle 80 is provided with an angularly offset arm 86 having weight 88 at its end, tending to maintain the blade with minimum oscillation but movable, as a whole, in a plane vertical to the plane of the conveyor.

The article entering onto the belt 60 (at random velocity from the tubular air lock) will either be accelerated or reduced in speed so that it assumes a forward speed equal to the speed of the belt 60 itself. This is insured by action of the blade 78 on the article which essentially interlocks the article with the belt so that the two move conjointly. This occurs no matter at what speed or frequency articles are fed to the belt. In fact, articles may be fed to the belt 60 with the leading ends of one abutting the trailing end of another without difficulty.

As the articles are discharged from the forward end of the belt 60, uniform separation and spacing is effected. The blade 78 acts on the article to maintain the article in horizontal position on the belt. As the article reaches the end, the blade and belt continue to cooperate and hold the rearward end of the article between them. This holding of the article maintains it in substantially horizontal position even as its forward end extends over the end of the belt. It is only after nearly all of the article has passed the end of the belt 60 that its weight forces it to tip downwardly and fall on to the receiving conveyor 16. The article consequently falls on the receiving station in almost horizontal fashion and is not canted transversely to the discharge belt 60, before it leaves it, by any action of the receiving station. The receiving station 16 is preferably a movable conveyor adapted to move the article quickly away from the end of belt 60.

Simultaneous the following articles are continually maintained in flat horizontal position on belt 60 out of the way of the preceding article falling into the receiving station. Even if the articles are abutting the second or following article being maintained horizontally over the end of the belt 60, they do not begin their fall on to the receiving station until the preceding or first article is removed from the discharge end of the belt 60 on receiving conveyor 16.

This arrangement of a longitudinally moving conveyor and a depending flexible blade provides a number of advantages. First, the continued action of blade and belt on the moving article causes the article to be transported along the conveyor so that a specific discharge speed is attained no matter what its infeed speed is coming from the chute 52. Second, the articles leave the discharge belt, spaced one from the other, through speed and gravity interplay. Succeeding articles are separated one from the other and the possibility of articles bunching up or crowding is overcome. Third, the flexible blade device maintains cylindrical articles, such as cigars, in a relative fixed position with respect to its own longitudinal axis and inhibits their turning, rolling and/or canting as they are moved along the belt or onto the receiving station 16.

The articles are delivered from belt 60 to suitable storage areas which may, if desired, be trays, molding forms or boxes. Since such devices are quite common, the receiving station 16 is shown in schematic form comprising a catcher belt 90, from which they may be collected, inspected and boxed, either manually or automatically. It is to be noted, however, that for the preferred operation, the intake of any receiving station should be located at a somewhat lower level, below the exit of the discharge belt and should be movable so as to carry the articles away therefrom.

FIG. 4 shows a modification of the present invention in which the discharge belt 60a is located within the chamber of the air lock device 10a itself and extends through the terminal or outlet end 46a. The belt thus may be employed to positively carry the article out of the air lock device should the force of air or other factors inhibit its free exiting. In this case, the terminal flap 44a serves a dual function of acting not only as the air lock means but also as the depending blade member. The flap which is, of course, flexible and resilient is hinged so that it will rest upon the discharging article and act to stabilize the article in horizontal interlocked position on the discharge belt 60a. The operation is, of course, exactly the same as that explained in the preferred form. In FIG. 4, we have also shown a receiving station 16a which comprises a conveyor moving along the axis of the path of movement of the discharge conveyor 60a, rather than transversely as shown in the previous FIGS.

The other elements of the device shown in FIG. 4 will be obvious, for example, manifold, guide tube and source of suction.

It will now be seen that we have provided a terminal air lock device for a pneumatic conveyor which is both efficient in operation and safe for use with fragile articles; a discharge device which will space randomly, feed articles and uniformly distribute them.

While the present invention has been described in a preferred embodiment, it will be obvious to those skilled in the art that various modifications can be made therein within the scope of the invention. It is intended that the appended claims cover all such modifications.

We claim:

1. Apparatus for conveying rodlike articles comprising, a tubular conveyor having an exit terminus and pneumatic means for propelling said articles therethrough, an air lock device located at said exit terminus for discharging said articles from said conveyor comprising, a tubular guide having a length greater than an individual one of said articles and hinge type flap members covering each end of said guide, said flaps being normally disposed to seal said ends on application of said pneumatic means, a housing mounted about said tubular guide having its walls spaced therefrom to form a closed chamber surrounding said guide, said guide being provided with an opening into said chamber whereby the interior of said guide is caused to communicate therewith for release and absorption of air.

2. The apparatus according to claim 1 wherein said housing is tubular and is coaxially aligned with the guide and sealed with respect thereto to form an annular closed chamber therewith.

3. The apparatus according to claim 2 wherein the tubular guide is provided with a plurality of elongated slots axially formed in the walls thereof.

4. The apparatus according to claim 1 including means for coupling the air lock to the tubular conveyor, comprising a manifold having an inlet and outlet opening and a port communicating with the source of pneumatic means, the terminus of said conveyor being secured within the inlet opening of said manifold device and extending through said device into said exit opening, said exit opening being radially spaced from the end of said terminus to provide a path of air flow from said conveyor into said manifold device.

5. The apparatus according to claim 4 wherein the terminus of the conveyor is tapered and wherein the outlet wall is conically shaped to form the outlet.

6. The apparatus according to claim 5 wherein one of the flaps is mounted to cover the outlet of the manifold and the upstream end of the tubular guide is provided with a conically shaped coupling securing the guide to the manifold, said coupling surrounding and receiving the flap in operation.